June 28, 1960   M. L. WOOD   2,942,779
INTEGRATING DEVICE
Filed Sept. 30, 1952   2 Sheets-Sheet 1

INVENTOR
MARION L. WOOD
BY
*James A. Ruth*
AGENT

United States Patent Office 2,942,779
Patented June 28, 1960

2,942,779

INTEGRATING DEVICE

Marion L. Wood, Highland, N.Y., assignor to International Business Machines Corporation, New York, N.Y., a corporation of New York Filed Sept. 30, 1952, Ser. No. 312,187

9 Claims. (Cl. 235—154)

This invention relates generally to integrating devices and more particularly to an integrating device which is entirely electronic in character.

It is an object of the invention to provide an electronic integrating device capable of accepting non-digital data and for translating the same into a digital notation.

Another object of the invention resides in the provision of means for the digital evaluation of non-digital data which is expressed in terms of voltages.

Another object of the invention resides in the provision of means for the digital evaluation of non-digital data which is expressed in terms of changes in resistance.

Another object of the invention resides in the provision of means for the digital evaluation of non-digital data which is expressed in terms of changes in capacitance.

Yet another object of the invention resides in the provision of an integrating means in which the integrand may be varied during the integrating cycle.

Another object of the invention resides in the provision of integrating means in which the integrand is adjusted to maintain a constant value during the integrating cycle.

Another object of the invention resides in the provision of integrating means in which the upper limit of integration may be adjusted to maintain a constant value during the integration cycle.

Yet another object of the invention resides in the provision of electronic integrating means for displaying a true average value of a varying quantity.

In accordance with the invention a pair of oscillators is used one of which is variable in the frequency of oscillations produced and the other which is variable both in frequency and in phase. These oscillators are controlled from a pair of variable data function inputs and act together to supply a measured number of oscillations to a result register under the supervision of cycle controlling circuits.

Other objects of the invention will be pointed out in the following description and claims and illustrated in the accompanying drawings, which disclose, by way of example, the principle of the invention and the best mode, which has been contemplated, of applying that principle.

Figure 1:
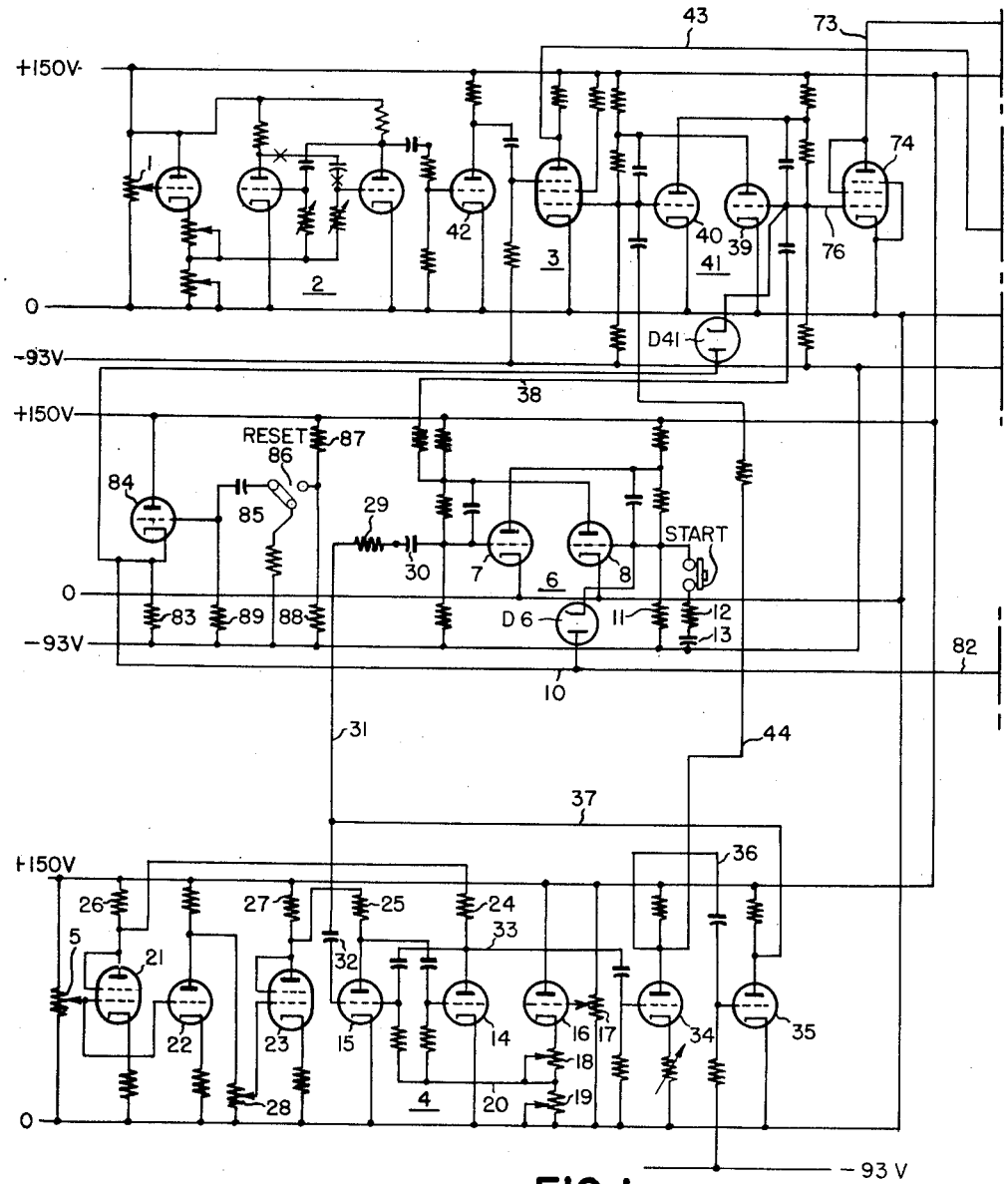
Fig. 1 is a schematic diagram of the oscillators and control circuits.
Figure 3:
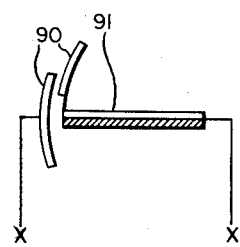
Fig. 3 is a schematic representation of a thermoresponsive bimetallic element for adjusting the value of a capacitance in response to changes in temperature interchangeable with a condenser in the integrand oscillator as indicated by point X—X.

According to the invention a pair of oscillators (Fig. 1), a result register (Fig. 2) and a controlling apparatus (Fig. 1) therefor comprise the integrator. One of these oscillators serves as a source of operating impulses for stepping the result register, there being one register operating impulse generated per cycle of this oscillator. The frequency of this first oscillator may be varied by the adjustment of a voltage bias to different values, or by adjustment of the setting of a variable capacitor, or by the adjustment of the value of a resistance element. It will be undersood that there are many known devices, such as a photocell which, for example, may be used as an operating means for generating an adjustment of a voltage in response to a light variation. The second of these oscillators incorporated in the invention provides a means for determining the duration of each integrating cycle. In other words, this would be the length of time that pulses generated by the first oscillator are applied to the result register. Here, also, time durations are measured by the pulse repetition frequency and accordingly it is desired that means be included to vary the frequency of this second oscillator. In the disclosed embodiment the frequency is varied by a manual adjustment of a resistance potentiometer tap although it will be understood that other known manual and/or automatic means can be used.

When using the device as a scale, for example, a primary measuring device would act to adjust the value of the frequency of the first oscillator hereinabove mentioned. This value corresponds to an integrand. The upper limit of the variable of integration would be adjusted to produce the digital result in the desired units and to the desired number of decimal places. The pulse repetition frequency of the second oscillator determines this upper limit. While mention will be made hereafter of the frequency of the second oscillator, it will be understood that only a single oscillation cycle of this oscillator is used to determine the time during which pulses generated by the first oscillator are applied to the result register. In terms of the devices used, this would mean that the frequency of the oscillator supplying the result register operating pulses would be varied by the primary measuring device, and the other oscillator would be adjusted to give the result in the desired units. If the primary measuring device were measuring a quantity that varied during the cycle of operation, the result shown would be the true average value during the cycle of measurement.

Hence, it will be understood, that the device is basically an integrator in which the integrand may either be varied during the integration cycle or pre-adjusted to maintain any constant value during the cycle; and the upper limit of the variable, or argument, of integration may be preadjusted to maintain any constant value during the cycle. In the device disclosed, the lower limit is always zero. In varying the value of the integrand during an integration operation, however, the sign of the integrand is not changed.

Figure 2:
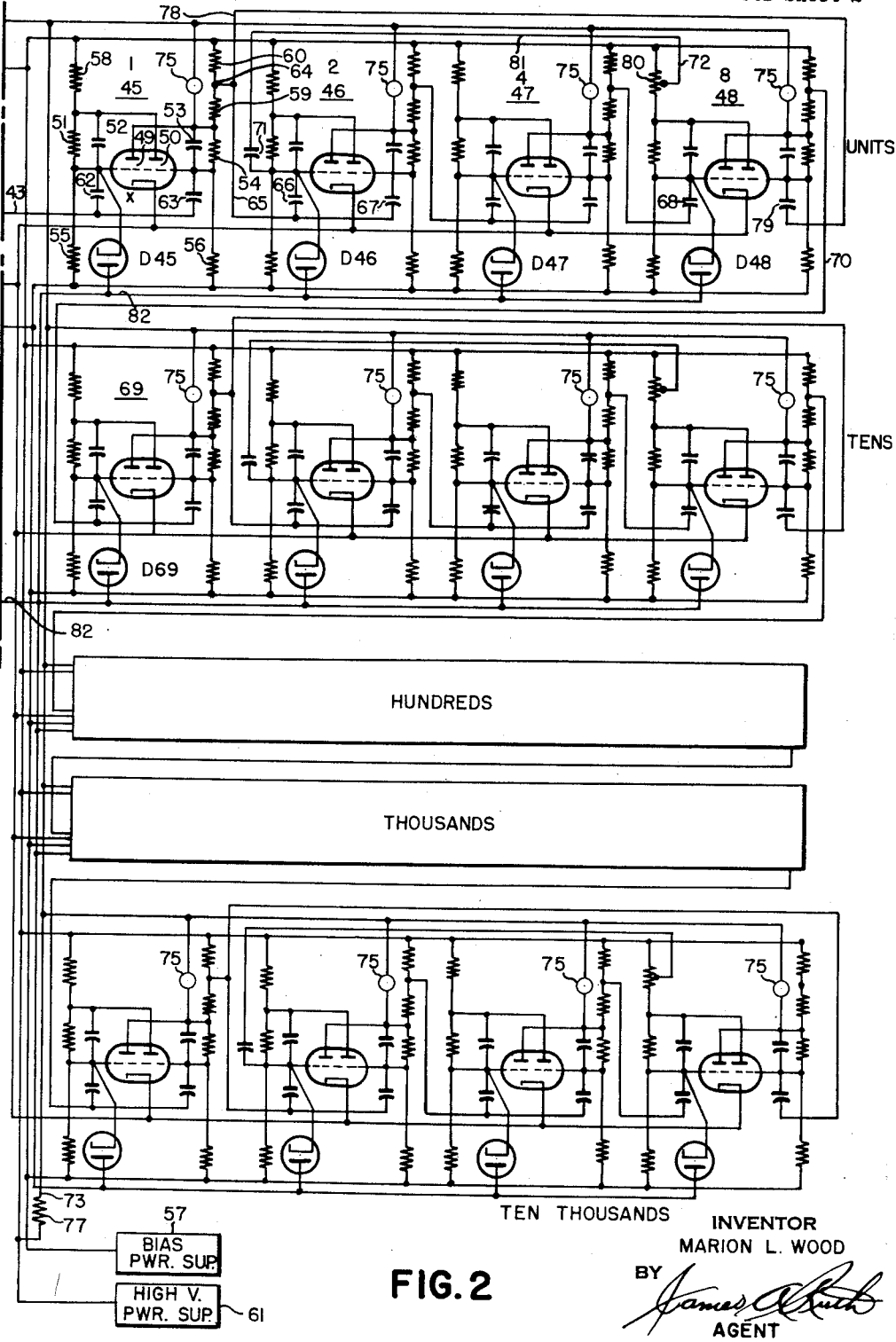
Fig. 2 is a schematic circuit diagram of the result register.

Fig. 2 shows a result register adapted to display the translated data in the usual 10's notation wherein each order is subdivided into 10 units and the value of the unit is displayed in binary-decimal form according to the combinational code 1–2–4–8.

When using the device as an integrator, a primary "function input" device would be caused to vary the frequency of the register input pulses in accordance with the integrand, as above explained; and the voltage bias, resistance or capacitance adjustment of the other oscillator made in the following manner. Assume the limits of the variable of integration are to be 0 and 8, and the maximum value of the integrand is to be 9, set the "function input" device at 9 and, without changing this setting, run through as many integrating cycles as are required in order to adjust the other oscillator such that the register shows 72 as a result of an integration cycle, the device is thus calibrated to the units of the function under investigation. The adjustment of the second oscillator, which is the integration limit oscillator, is effected by two interrelated controls; the first control is adapted to vary the frequency rate for determining the duration of a measurement or integration cycle, and the second control is adapted to vary the time during which a selected phase, or part, of a single oscillation or wave cycle is effective for the purpose of supervising control circuits to be described later. Then when an integration cycle is performed in which the input is made to vary in accordance with the integrand, the result will be the true definite integral of the function between the preselected limits.

The digital representation is produced by use of an electronic counter circuit in which the potentials (with respect to an arbitrary reference point) of several key points are varied in accordance with the number of pulses of negative voltage applied to the circuit. These potentials are "measured" by use of neon glow tubes connected between these points and the point of reference potential, each glow tube being assigned a digital value such that the sum of the values represented by the glow tubes that are conducting equals the number of negative pulses received by the counter. Counters of this type are well known in the art. The pulses of negative voltage required to operate the counter are produced by a multivibrator coupled to the counter circuit. The number of pulses applied to the counter circuit is determined by the frequency of the multivibrator, and the length of time during which its output (negative pulses) is actively coupled to the counter circuit.

Between the multivibrator and the counter circuit is injected an electronic "gate." This gate is opened and closed in synchronism with the initiation and termination of conduction of one of the tubes (hereinafter called the control tube) of a second multivibrator. The time of conduction of this tube may be varied by variation of the frequency of the multivibrator with which it is associated, or by changing the time constants of the multivibrator circuit in such a manner that the frequency remains constant (and therefore the "period") but the percentage of the period during which this tube conducts is changed.

By referring to Figs. 1 and 2, there is shown an integrating device according to the invention which comprises a function input 1 (Fig. 1), for controlling the pulse repetition rate of an integrand oscillator 2. The pulse output of this oscillator is fed to a register (Fig. 2) through a gating circuit 3. The upper limits of integration are controlled by a limit oscillator 4 whose pulse period is settable under control of an integration limit input 5.

The mechanism for controlling these oscillators and the result register will now be described. Refer to Fig. 1. An operation initiating trigger of the double stability type comprising the usual pair of cross-coupled triodes 7, 8 is provided with a start switch 9 connected between the control grid of triode 8 and the grid bias voltage supply line 10 in parallel with the usual grid resistor 11. In series with the start switch a resistor 12 and a condenser 13 are connected. The double stability trigger 6 and other triggers of this type will be hereinafter described as having two states of operation, one an "off" state, the other an "on" state. For a description of a trigger such as is used here reference should be made to Patent 2,584,811, issued February 5, 1952 to B. E. Phelps. When trigger 6 is in the non-operated, or "off," state triode 8 is rendered conductive. Depression of the start button 9 connects the grid of triode 8 to the minus 93 volt bias supply line 10 through resistor-condenser network 12, 13. This network has an effective initial impedance of approximately one half that of resistor 11. Hence, when the start button 9 is depressed and its contacts closed a negative going impulse will be impressed upon the grid of triode 8 of sufficient magnitude to cause the trigger 6 to reverse its state of operation from "off" to "on" by starting conduction in tube 7 and stopping conduction in tube 8.

The limit oscillator 4 comprises a free-running multivibrator of usual and well known structure employing a pair of triodes 14 and 15. This oscillator is provided with both frequency and period controlling means. The repetition frequency of oscillator 4 is controlled by varying the bias voltage imposed upon the grids of triodes 14 and 15. This is accomplished through a network comprising tube 16, a grid bias voltage potentiometer control 17 therefor and cathode potentiometers 18 and 19. Tube 16 is caused to act merely as a variable impedance across the main 150 volt potential supply. As its conductance is varied by moving the tap on potentiometer 17 the voltage appearing on its cathode tap and on line 20 is similarly varied. Potentiometer 17 provides for a coarse setting of the repetition frequency of the limit oscillator 4 while potentiometers 18 and 19 provide a vernier control.

The conduction time or period of triode 15 may be also varied. This is done by manually adjusting the integration limit control potentiometer 5 the tap of which is connected to the control grids of tubes 21 and 22. Triode 22 is merely a phase reversing tube inserted in the circuit between the integration limit control 5 and tube 23. The plates of each of the oscillator tubes 14 and 15 are connected via resistors 24 and 25 respectively to the plates of tubes 21 and 23 respectively each of which tubes is provided with its own independent plate resistors 26 and 27. It will be understood that the voltages impressed upon the plates of the oscillator tubes 14 and 15 will vary in inverse ratio proportionately to the extent of movement of the limit control tap. For example, if the bias voltage applied to the control grid of tube 21 is increased by moving said tap in an upward direction, the conductance of the tube is increased and the voltage drop across resistor 26 also increased thereby lowering the voltage applied to the plate of oscillator triode 14. At the same time the conductance of tube 22 increased thereby caused the voltage appearing across potentiometer 28, connected in shunt therewith to be lowered and to reduce proportionately the bias voltage on the control grid of tube 23 to render it less conductive and cause a reduction in the voltage drop across resistor 27 or, in other words, an increase in the voltage applied to the plate of triode 15. Hence, it will be understood that with different voltages applied to the plates of tubes 14 and 15 the constants of the two cross-over networks will be different and hence the periods within which each tube is rendered conductive will be proportional to the time constants above referred to. Because the voltage on the plate of one tube of the pair was raised an amount equal to the reduction of voltage applied to the plate of the other tube of the pair, the sum of the time constants is unchanged and therefore the relaxation time, or repetition frequency of the oscillator is unaffected.

It was pointed out hereinabove, that closure of start contacts 9 turned the trigger 6 on and in the "on" state triode 7 was rendered conductive. The control grid of triode 7 is extended through resistor 29 and condenser 30 over wire 31 and through condenser 32 to the grid of tube 15 of the limit oscillator 4 such that tube 15 is rendered conductive concurrent with the operation of the "start" button 9. Trigger 6 will remain in the "on" state until the next time tube 14 starts to conduct after the start contacts have been closed. When tube 14 starts to conduct a negative pulse will be produced in its plate circuit and be carried over wire 33 to the grid of tube 34. Such negative pulse will be inverted 180° in phase on the plate of tube 34 and be applied as a positive pulse to the grid of tube 35 over the connection 36 therebetween. Tube 35 will again invert said pulse and apply same over wires 37 and 31 to the grid of triode 7 rendering said tube non-conductive and turning trigger 6 to its "off" state. In so doing a negative pulse is produced at the plate of tube 8 and is transmitted over connection 38 to the grid of tube 39. Tubes 39 and 40 comprise a second double-stability trigger 41. Normally this trigger is in its "off" state when tube 39 is conducting. Hence, the resetting pulse created by trigger 6 operates to turn on trigger 41. When trigger 41 is in its "on" state tube 40 is rendered conductive and because the control grid of gate tube 3 is directly connected to the grid of tube 40 it is conditioned to become conductive each time the voltage on its suppressor grid is brought to zero with respect to the cathode.

As oscillator 2 is free-running the pulses produced thereby are continuously applied to said suppressor grid through phase inverter tube 42, and said pulses will be transmitted by gate tube 3 whenever trigger 41 is resting in its "on" state. These pulses are extended over wire 43 to the input trigger 45 (Fig. 2) of the first order of the result register.

The transmission of pulses from oscillator 2 to the result register continues to prevail during the entire time that tube 14 of the limit oscillator 4 is rendered conductive. When tube 14 ceases to conduct a positive going pulse is produced on its plate, is transmitted over wire 33 through the phase inverter tube 34 and over wire 44 as a negative pulse to the grid of tube 40, part of trigger 41, rendering said tube non-conductive and causing the trigger to revert to its "off" state. As trigger 41 is turned off a negative potential is applied to the control grid of gate tube 3 rendering the same non-conductive and stopping the flow of pulses from oscillator 2 to the result register shown in Fig. 2. The figure standing in the result register is proportional to the repetition frequency of oscillator 2 and the conduction time of tube 14 of the limit oscillator 4.

The impulses produced on line 43 are fed to a result register. The register has five orders where each of the orders represents the units, tens, hundreds, thousandths and ten thousandths order, respectively. Each order of an electronic counter comprises four trigger circuits and inasmuch as each of the five orders is similar only the units order of the register shall be described.

With reference being made to Fig. 2, the units order comprises four trigger stages which are numbered 1, 2, 4 and 8 according to the binary notation system and are respectively referred to as triggers 45, 46, 47 and 48. The binary number assigned to each of the stages represents the number of pulses necessary to operate the particular stage. The first trigger stage 45 comprises a pair of electron discharge devices or tubes 49 and 50 each having a common cathode coupled to the ground side of the main power supply source. While a duo-triode tube is shown it should be understood that a pair of triodes may also be used. The anode of each device is cross-coupled to the control grid of the other device through an impedance network comprising a resistor and a capacitor such as 51, 52, 53 and 54, respectively. The grid resistor of each device, such as 55 and 56, is connected between the respective grid thereof and the low side of the bias power supply source 57. The anode resistor of tubes 49 and 50, such as 58 and the series resistors 59 and 60, respectively, is connected between the positive side of the main power supply source 61 and the junction of the impedance network associated therewith. The control grids of each tube are coupled together through the capacitors 62 and 63. The output from the gate tube 3 is applied by means of line 43 to two points of the first trigger 45 through the capacitors 62 and 63. The output from the first trigger is tapped off at the junction 64 of the resistors 59 and 60 and through the medium of the connecting line 65 and is applied to the second trigger 46 through the capacitors 66 and 67 coupled thereto. The circuit connections for the four trigger stages are substantially identical except for the difference in applying the output from the third trigger 47 to the last trigger 48. The input to the last trigger is applied only to the left hand device through the capacitor 68 coupled thereto while the output of the last trigger is applied to the first trigger 69 of the tens order by means of the line 70. The grid of the right hand device of the last trigger is coupled to the second trigger through the capacitor 71 associated therewith and the line 72 for purposes to be subsequently described. For the purposes of indicating the condition of each trigger stage neon lights 75 are connected from the anodes of the left hand tubes to a common line 73 which is extended to one side of all triggers and to the plate of tube 74, later to be described. Hence, each neon light effectively is shunted across the anode resistors of one tube in each trigger. When a trigger is on, the voltage drop across said anode resistor is sufficient to cause 75 to ignite. When the trigger is off, the associated neon light 75 remains extinguished. Thus the neon lights 75 manifest the "on" and "off" pattern of the trigger circuits thereby permitting visual reading of a count.

The aforementioned described circuit connections between the trigger circuits of the register produces a frequency division of impulses which impulses are counted during the time of application of the impulses. For the first nine pulses applied to an order the trigger circuits operate in accordance with the binary notation system. On the tenth pulse, however, there is an automatic forced resetting of the trigger circuits which returns the trigger circuits to the original zero condition thereby maintaining a cyclical operation of each counter column on a tens notational basis. Thus the "on" and "off" pattern of the four trigger circuits repeats for each ten pulses applied thereto.

In the actual operation of the register, the four trigger circuits of the units column are considered to be "off" when in a zeroized status. At the zeroized status of the trigger circuits, the left hand tube of each trigger is conducting inasmuch as this device is zero biased while the right hand tube of each trigger is non-conducting. The trigger circuits of the register are considered to be "on" when the right hand tube is conducting.

Hereinabove it was mentioned that the gate tube 3 was rendered conductive when trigger 41 was shifted in status from right to left. It will be noted that a connection wire 76 extends from the grid of trigger tube 39 to the grid of tube 74. Hence it will be understood that tube 74 is rendered conductive each time trigger 41 is reset to its off status. This action causes current to be drawn through resistor 77 (Fig. 2) thereby lowering the voltage on line 73 to which one side of all neon tubes 75 are connected. Hence, when all register triggers are zeroized and trigger 41 is in the "off" state, all neon lights 75 will be extinguished.

When the negative pulse produced on line 43 (Fig. 1) is concurrently applied to the two points of the first trigger 45 (Fig. 2) of the units orders there will be only a single shift thereof since the pulse will have no direct effect upon the non-conducting tube. With the application of the first pulse on to the first trigger after the counter has been placed in a zeroized status by methods to be described subsequently, the left hand tube will be rendered non-conducting and the right hand tube conducting resulting in the igniting of the neon light associated therewith (trigger 41 is now in its "on" state and tube 74 is cut off, thereby raising the potential on line 73) which indicates that the trigger is on. When the right hand tube conducts a positive pulse is applied to the second trigger 46 which due to the parameters thereof does not respond to positive pulses. The parameters of each trigger of the counter are such that they do not respond to positive impulses.

With the application of the second negative pulse to the first trigger, this trigger is tripped back to its "off" state and the second trigger 46 is tripped "on" due to the negative pulse applied from the first trigger over wire 65. The third and fourth impulses produced on 43 cause a further "on" and "off" shift of trigger 45. As the first trigger shifts "off" upon the fourth pulse, the second trigger 46 is tripped "off" which is accompanied by the third trigger 47 being tripped "on." The fifth and sixth impulses on 43 cause a double shift of trigger 45 and a single shift to "on" status of trigger 46 with trigger 47 retaining its "on" status. The seventh and eighth impulses from 43 again causes trigger 45 to shift twice and the triggers 46 and 47 to shift "off." On the eighth pulse trigger 48, which is coupled to the trigger 47 only through the capacitor 68, shifts "on." The ninth impulse derived from shifts on trigger 45 while trigger 48 is unaffected thereby and thus retains its "on" status.

The circuit connection 78 coupled to the junction of resistors 59 and 60 of trigger 45 is applied to the grid of the right hand tube of trigger 48 through the capacitor 79. Thus when the tenth impulse is applied to trigger 45 which shifts it "off" there results a negative impulse which when applied to trigger 48 through the capacitor 79 also shifts "off" this trigger and zeroizing this order of the register. The resistor 80 of trigger 48 is coupled through the line 81 to the left side of trigger 46 through the capacitor 71. Therefore as trigger 48 shifts "off," the voltage drop across its resistor 80 decreases thereby producing a positive impulse to the left side of trigger 46. This positive impulse acts to block the normal action of the negative pulse which is applied to this trigger when trigger 45 is shifted off whereby trigger 46 is now blocked from switching. Thus on the tenth impulse all the triggers are restored to their original zero condition or zeroized status by a forced resetting of the triggers.

It will be noted that trigger 45 reverses its status for every impulse, that trigger 46 reverses status for every four impulses applied to trigger 45 or for every pair of negative pulses produced by trigger 45, that trigger 47 reverses its status for every eight impulses applied to trigger 45 or for every pair of negative impulses produced by trigger 46 and that trigger 48 reverses once for every ten impulses fed to trigger 45.

Whenever a counter order passes from a count of 9 to 0, it is necessary that a count of 1 must be entered into the next higher counter order. To attain this result the right hand tube of trigger 48 of the prior order is coupled to the input trigger 69, for example, of the next higher order. Thus, when the tenth impulse is applied to the units order and trigger 48 is tripped "off" a negative pulse is applied to trigger 69 of the tens order.

Prior to the initiation of each measuring cycle it is necessary that the result counter be reset to —00000—. In Fig. 2 it is shown that each order of the register is provided with four diodes D45, D46, D47 and D48 as are the control triggers 6 and 41 having diodes D6 and D41 connected thereto. The anode of each diode is connected to the line 82 which is coupled to the junction of resistor 83 and the cathode of tube 84 as shown in Fig. 1. The resistor 83 is a cathode follower resistor for the tube 84 with the anode thereof connected to the high side of the 150 volt source and whose control grid is connected through a condenser 85 and a reset switch 86 to the midpoint of a voltage divider 87, 88. A resistor 89 permanently connects the grid of tube 84 to a bias voltage bus 10 whereby the tube 84 is maintained normally at low conduction or is cut off entirely. Consequently, the anodes of all the diodes D6, D41, D45, D46, D47 and D48 are normally negative with respect to their cathodes regardless of the "on" and "off" status of the register triggers.

The cathodes of each of the diodes D45, D46, D47 and D48 is connected to the junction between 52 and 62 of the trigger circuit related thereto.

A reset of the register is effected by applying a positive impulse to resistor 89 through the capacitor 85, which is associated with the tube 84, closure of switch 86 such as to connect 85 with the midpoint of 87, 88. The positive pulse reduces the negative bias of the tube 84, which, as a result, is rendered more conductive, resulting in a current flow therethrough and through the resistor 83. The resulting positive impulse produced on the resistor 83 raises the anode potential of each of the diodes D6, D41, D45, D46, D47 and D48 at least to the cathode potential of the trigger circuit associated with each diode and if any trigger is on it is switched off. Thus the application of a single positive impulse to the resistor 89 causes a reset of the result counter to —00000— and also a reset of each of the triggers 6 and 41.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A cyclical analogue to digital value integrating converter comprising, in combination, a value receiving network of electronic discharge tubes operable by electrical impulses to receive a value representative of the number of pulses applied thereto, a first oscillator, means for adjusting the repetition frequency of said oscillator according to the magnitude of an integrand value, a second oscillator, means for adjusting the repetition frequency of said second oscillator selectively such that a single wave cycle thereof determines the limits of an integration cycle, means for initiating an integrating cycle, circuits coacting with said cycle initiating means and said second oscillator for admitting electrical pulses originating with said first oscillator to the value receiving network, and means responsive to said single wave cycle produced by said second oscillator for disabling said circuits to interrupt the flow of electrical pulses to said network.

2. Electronic data conversion means operable to convert a variable function presented in an analogue notation to the equivalent decimal notation comprising, in combination, a condition responsive mechanism for sensing a change in environment, a variable capacitor operated thereby, an integrand oscillator adapted to produce impulses having a repetition frequency proportional to the range of settings of said condition responsive mechanism, a variable frequency, variable phase integration limit oscillator operable to produce a single effective wave cycle representative of the upper limit of a to be performed integration, a register responsive to electrical impulses produced by said integrand oscillator, and adapted to manifest in a modified binary notation the decimal equivalent of a position setting of said condition responsive mechanism, an electronic gate circuit interposed in circuit relation between said oscillators and said register and responsive to said integrand oscillator when conditioned under control of said limit oscillator to transmit the impulses produced by the integrand oscillator to said register during said single wave cycle of the integration limit oscillator.

3. An analogue to digital value integrating converter comprising, in combination, a multidenominational order electronic counter adapted to register plural order values representing the digital value of a series of discrete electrical impulses, a condition responsive element adapted to vary its characteristics in response to changes in conditions, a first oscillator having means for varying the frequency thereof over a broad range settable according to the maximum value of a to be determined integrand value, means responsive to changes in the characteristics of said element for varying the oscillator frequency over a narrower range, a second oscillator, means for adjusting the repetition frequency of said second oscillator selectively such that a single wave cycle thereof determines the limits of a to be performed integration, means for initiating an integrating cycle, circuits coacting with said cycle initiating means and said second oscillator for admitting electrical impulses originating with said first oscillator to the electronic counter, and means under control of said second oscillator for disabling said circuits to interrupt the flow of electrical impulses to the counter following the first oscillation cycle of said second oscillator.

4. A cyclical analogue to digital value integrating converter comprising, in combination, a value receiving network of electronic discharge tubes operable by electrical impulses to receive a value representative of the number of pulses applied thereto, a first oscillator, means for adjusting the repetition frequency of said oscillator according to the magnitude of an integrand value, a second oscillator, means for adjusting the repetition frequency of said second oscillator selectively such that a single wave cycle thereof determines the limits of an integration cycle, impulse producing means for initiating an integrating cycle, trigger means responsive to said impulse producing means for synchronizing the beginning of said single wave cycle with said impulse producing cycle initiating means, circuits coacting with said cycle initiating means and said second oscillator for admitting electrical pulses originating with said first oscillator to the value receiving network, and means responsive to said single wave cycle produced by said second oscillator for disabling said circuits to interrupt the flow of electrical pulses to said network.

5. A cyclical analogue to digital value integrating converter comprising, in combination, a value receiving network of electronic discharge tubes operable by electrical impulses to receive a value representative of the number of pulses applied thereto, a first oscillator, means for adjusting the repetition frequency of said oscillator according to the magnitude of an integrand value, a second oscillator, means for adjusting the repetition frequency of said second oscillator selectively such that a single wave cycle thereof determines limits of an integration cycle, impulse producing means for initiating an integrating cycle, first trigger means responsive to said impulse producing means for synchronizing the beginning of said single wave cycle with said impulse producing cycle initiating means, a gate circuit for admitting electrical pulses originating with said first oscillator to the value receiving network, second trigger means responsive respectively to said first trigger means and to said second oscillator operating over a single wave cycle for rendering said gate circuit responsive and non-responsive respectively to transmit said electrical pulses.

6. An analogue to digital value integrating converter comprising, in combination a multidenominational order electronic counter adapted to register plural order values representing the digital value of a series of discrete electrical pulses, reset means for setting said counter to manifest a zero value, a condition responsive element adapted to vary its characteristics in response to changes in conditions, a first oscillator having means for varying the frequency thereof over a broad range settable according to the maximum value of a to be determined integrand value, means responsive to changes in the characteristics of said element for varying the oscillator frequency over a narrower range, a second oscillator, means for adjusting the repetition frequency of said second oscillator selectively such that a single wave cycle thereof determines the limits of a to be performed integration cycle, impulse producing means for initiating an integrating cycle, trigger means responsive to said impulse producing means for synchronizing the beginning of said single wave cycle with said impulse producing cycle initiating means, circuits coacting with said cycle initiating means and said second oscillator for admitting electrical impulses originating with said first oscillator to the electronic counter, and means under control of said second oscillator for disabling said circuits to interrupt the flow of electrical impulses to the counter following the first oscillation cycle of said second oscillator.

7. An analogue to digital value integrating converter comprising, in combination a multidenominational order electronic counter adapted to register plural order values representing the digital value of a series of discrete electrical pulses, reset means for setting said counter to manifest a zero value, a condition responsive element adapted to vary its characteristics in response to changes in conditions, a first oscillator having means for varying the frequency thereof over a broad range settable according to the maximum value of a to be determined integrand value, means responsive to changes in the characteristics of said element for varying the oscillator frequency over a narrower range, a second oscillator, means for adjusting the repetition frequency of said second oscillator selectively such that a single wave cycle thereof determines the limits of a to be performed integration cycle, impulse producing means for initiating an integrating cycle, first trigger means responsive to said impulse producing means for synchronizing the beginning of said single wave cycle with said impulse producing cycle initiating means, a gate circuit for admitting electrical pulses originating with said first oscillator to the value receiving network, second trigger means responsive respectively to said first trigger means, said second oscillator operating over a single wave cycle for rendering said gate circuit responsive and non-responsive respectively to transmit said electrical pulses.

8. Electronic mechanism for manifesting in digital form average values of a variable occurring in a selected measurement cycle comprising, in combination, a plural order digital number register, an integrand oscillator adapted to produce electrical pulses for operating said register, means automatically responsive to a variable for proportionately varying the pulse repetition frequency output of said integrand oscillator, means for setting the duration of a measurement cycle during which said variable is to be integrated, a limit oscillator responsive to said measurement cycle duration setting means for producing a single oscillation in each measurement cycle, variable means for adjusting the time duration of a selected phase of said single oscillation, means for initiating a measurement cycle, means responsive to the start of an oscillation produced by said limit oscillator for admitting actuating pulses produced by the integrand oscillator to said register and means responsive to the time duration of a selected phase of said single oscillation for interrupting the flow of said actuating pulses to said register.

9. Electronic data conversion means operable to convert a variable function presented in an analogue notation to the equivalent decimal notation comprising, in combination, a transducer for introducing analogue values of said variable function, a register responsive to electrical impulses and adapted to manifest any of different values in decimal notation comprising a network of selectively, successively energized electronic discharge tubes, a first free-running multivibrator, means connecting said transducer to said multivibrator to vary the frequency thereof in accordance with the setting of said transducer, a normally closed gate circuit, means connecting the output of said first multivibrator to the input of said gate circuit, means connecting the output of said gate circuit to said register, a second free-running multivibrator producing a train of pulses at a frequency substantially lower than that of said first multivibrator, means coupled to said second multivibrator to vary the duration of each pulse of said train, impulse producing means for initiating a measurement cycle, a first trigger circuit responsive to said impulse producing means to cause said second multivibrator to initiate the generation of a timing pulse, a second trigger circuit responsive to operation of said first trigger circuit to open said gate circuit to permit pulses from said first multivibrator to enter said register, and means responsive to the termination of said timing pulse to activate said second trigger to return said gate circuit to its normally closed condition and said first trigger to its initial condition, whereby pulses from said first multivibrator are admitted to said register only for the duration of the timing pulse output of said second multivibrator.

References Cited in the file of this patent

UNITED STATES PATENTS

| | | |
|---|---|---|
| 2,496,912 | Grosdoff | Feb. 7, 1950 |
| 2,537,427 | Seid et al. | Jan. 5, 1951 |
| 2,539,623 | Heising | Jan. 30, 1951 |
| 2,539,673 | Peterson | Jan. 30, 1951 |
| 2,560,434 | Gloess et al. | July 10, 1951 |
| 2,614,215 | Karp et al. | Oct. 14, 1952 |
| 2,616,965 | Hoeppner | Nov. 4, 1952 |
| 2,625,600 | Benaglio | Jan. 13, 1953 |
| 2,672,284 | Dickenson | Mar. 16, 1954 |
| 2,835,868 | Lindesmith | May 20, 1958 |

OTHER REFERENCES

The "Binary Quantizer," by Barney, K. H., "Electrical Engineering" for November 1949, pages 962–967.

"The Metrotype System of Digital Recording," article by G. E. Foster, published in "Electrical Engineering" for May 1950 (pages 427–430).